O. A. Cheney,
Stump Elevator.
N°52,967.  Patented Mar. 6, 1866.

Witnesses:
C. N. B. Kingsford
J. W. Bookwalter

Inventor.
O. A. Cheney.
By his Attorney
W. E. Dodge

UNITED STATES PATENT OFFICE.

ORSON A. CHENEY, OF ORLEANS TOWNSHIP, IONIA COUNTY, MICHIGAN.

IMPROVEMENT IN GRUBBING-MACHINES.

Specification forming part of Letters Patent No. 52,967, dated March 6, 1866.

*To all whom it may concern:*

Be it known that I, ORSON A. CHENEY, of Orleans Township, in the county of Ionia and State of Michigan, have invented certain new and useful Improvements in Grubbing-Machines; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

Figure 1:
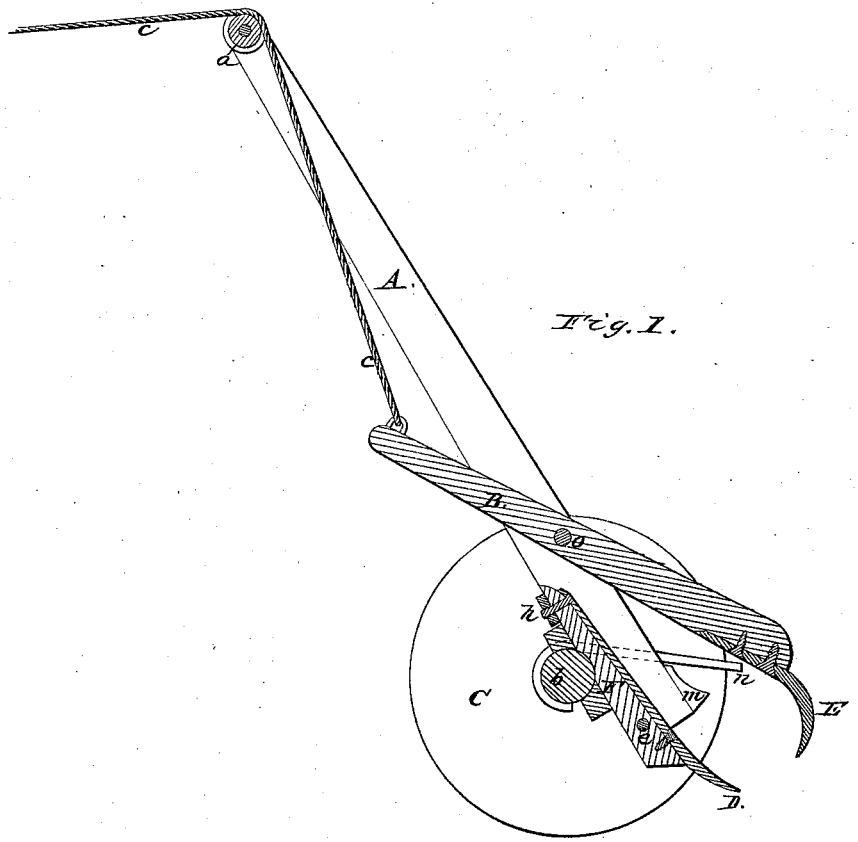
Figure 2:
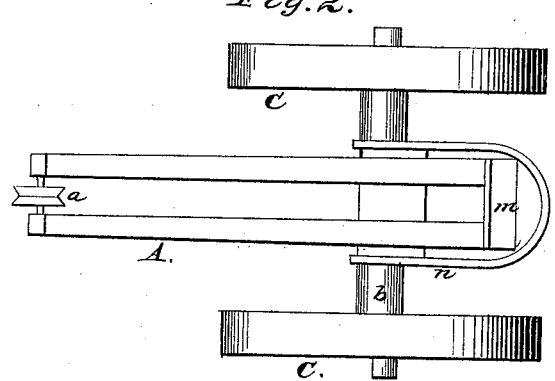

Figure 1 is a longitudinal vertical section, and Fig. 2 is a plan view.

The nature of my invention consists in a novel construction of a machine for extracting grubs from the soil, said machine being provided with a pair of hooks attached to levers and arranged to seize and hold the grub or root while it is being withdrawn from the earth.

The machine consists, essentially, of a long lever, A, composed of two parallel timbers secured at their rear end to an axle, *b*, mounted on two wheels, like a cart, the rear end of the lever A projecting slightly back of the axle, and having a cross-bar, *m*, secured to its upper side across its rear end, as shown in Fig. 2. A stirrup, *n*, having its front ends bent so as to clasp or hook over the axle, as shown in Fig. 2, is used in connection with the cross-bar *m* for pulling small stumps which project far enough above the surface to permit the stirrup *n* to be slipped over them. In these respects the machine does not differ essentially from others now in use; but with a machine thus constructed it is impossible to extract the grubs, which consist of a mere crown or knob having a mass of roots penetrating the soil, without any projecting stump over which the stirrup *n* may be made to engage. It is more particularly in the means provided for extracting these that my invention consists, and in so combining them with the machine, as already described, that it may be used for either purpose at will. To accomplish this I attach a pronged hook, D, to a strong piece of timber, F, resting on the axle *b* between the timbers A, and held firmly in place by a bolt, *e*, passing transversely through the timbers A and F, the front end of F being held down by a metal cross-bar, *h*, secured by a bolt to F and projecting at each side underneath the timbers composing the lever A, as shown in Fig. 1. I then pivot a lever, B, by a bolt, *o*, between the timbers composing the lever A, to the rear end of which a pronged hook, E, is firmly secured, having its end curved downward, as shown. To the opposite end of this lever B a strong rope or chain, *c*, is attached and passed over a pulley, *a*, secured at the front end of lever A, as shown in Fig. 1, and to this rope *c* the team or animal is attached.

The operation is as follows: The lever A is elevated at its front end so as to bring the hook or prong D close to the ground, when it is thrust under the edge or into the grub, the hook E engaging against or under the opposite side. By drawing on the rope *a* the hooks D and E are made to grasp and hold tightly upon the grub, the front end of the lever A being drawn down, which elevates the rear end, the axle *b* serving as a fulcrum, and thereby lifts or pulls the grub out of the ground. By simply removing the bolts *e* and *o* the hooks E and D may be removed and the cross-bar *m* replaced, as shown in red in Fig. 1, when, by applying the stirrup *n*, the machine can be used as previously described. By these means I produce an implement that can be used for extracting stumps, and also grubs, in a most perfect manner.

Having thus described my invention, what I claim is—

1. The lever B, provided with the hook E, in combination with the hook D and lever A, all arranged and operating as and for the purpose set forth.

2. Making the lever B, hook D, and cross-bar *m* removable, for the purpose of changing the implement from a stump-puller to a grubber, and vice versa, as set forth.

ORSON A. CHENEY. [L. S.]

Witnesses:
C. O. THOMPSON,
WM. W. JOHNSON.